United States Patent
Bolgar et al.

(10) Patent No.: US 7,044,162 B2
(45) Date of Patent: May 16, 2006

(54) MIXING VALVE CARTRIDGE

(75) Inventors: György Bolgar, Budapest (HU); Tamas Magócsi, Monorierdö (HU)

(73) Assignee: Kerox Multipolar II. Ipari Es Kereskedelmi Kft., Diosd (HU)

( * ) Notice: Subject to any disclaimer, the term of this patent is extended or adjusted under 35 U.S.C. 154(b) by 0 days.

(21) Appl. No.: 10/931,279

(22) Filed: Sep. 1, 2004

(65) Prior Publication Data

US 2005/0051221 A1 Mar. 10, 2005

(30) Foreign Application Priority Data

Sep. 1, 2003 (HU) .................................. 0302813

(51) Int. Cl.
*F16K 11/78* (2006.01)

(52) U.S. Cl. ............... 137/625.17; 137/625.4

(58) Field of Classification Search .......... 137/625.17, 137/625.4, 625.41
See application file for complete search history.

(56) References Cited

U.S. PATENT DOCUMENTS

| | | | | |
|---|---|---|---|---|
| 4,633,906 A | * | 1/1987 | Tuchman | 137/625.17 |
| 4,856,556 A | * | 8/1989 | Mennigmann | 137/625.4 |
| 4,986,306 A | * | 1/1991 | Ferrari | 137/625.17 |
| 5,417,242 A | * | 5/1995 | Goncze | 137/625.17 |
| 5,657,791 A | * | 8/1997 | Graber | 137/625.41 |
| 6,019,132 A | * | 2/2000 | Knapp | 137/625.17 |
| 6,131,611 A | * | 10/2000 | Knapp | 137/614.17 |

FOREIGN PATENT DOCUMENTS

| | | |
|---|---|---|
| DE | 40 28 450 A1 | 3/1992 |
| DE | 197 51 764 C2 | 6/1998 |
| EP | 0 427 057 A2 | 5/1991 |
| GB | 2 192 256 A | 1/1988 |
| WO | WO 98/55786 A1 | 12/1998 |

* cited by examiner

Primary Examiner—John Fox
(74) Attorney, Agent, or Firm—Venable LLP; Robert Kinberg; Ryan M. Flandro

(57) ABSTRACT

A mixing valve cartridge for mixing cold and hot water includes two, superimposed discs disposed in a cartridge housing and forming together a plane seal. One of the superimposed discs constitutes a fixed inlet disc and the other constitutes a control disc arranged on one side of the inlet disc in a movable and rotatable way. A lever is supported by a bearing sitting in a lever holder and is in a driving connection with the control disc via the ceramic moving element that includes a groove for a gasket. A bottom plate having inlet holes is arranged at the other side of the inlet disc and forms a bottom part of the housing. One side of the bottom plate is connected to the inlet disc. The other side of the bottom plate is connectable with connecting ducts. The ceramic moving element has a side facing the control disc that includes an annular stepped part parallel to the axis of the cartridge housing that is connected to the groove. The control disc has an annular stepped part fitting the stepped part of the ceramic moving element. Between the annular stepped parts a radial slot is situated which remains unchanged during operation of the mixing valve.

2 Claims, 6 Drawing Sheets

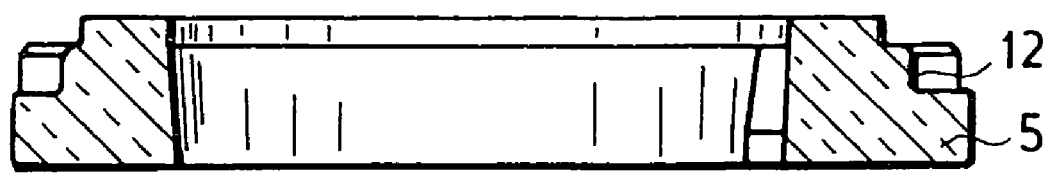
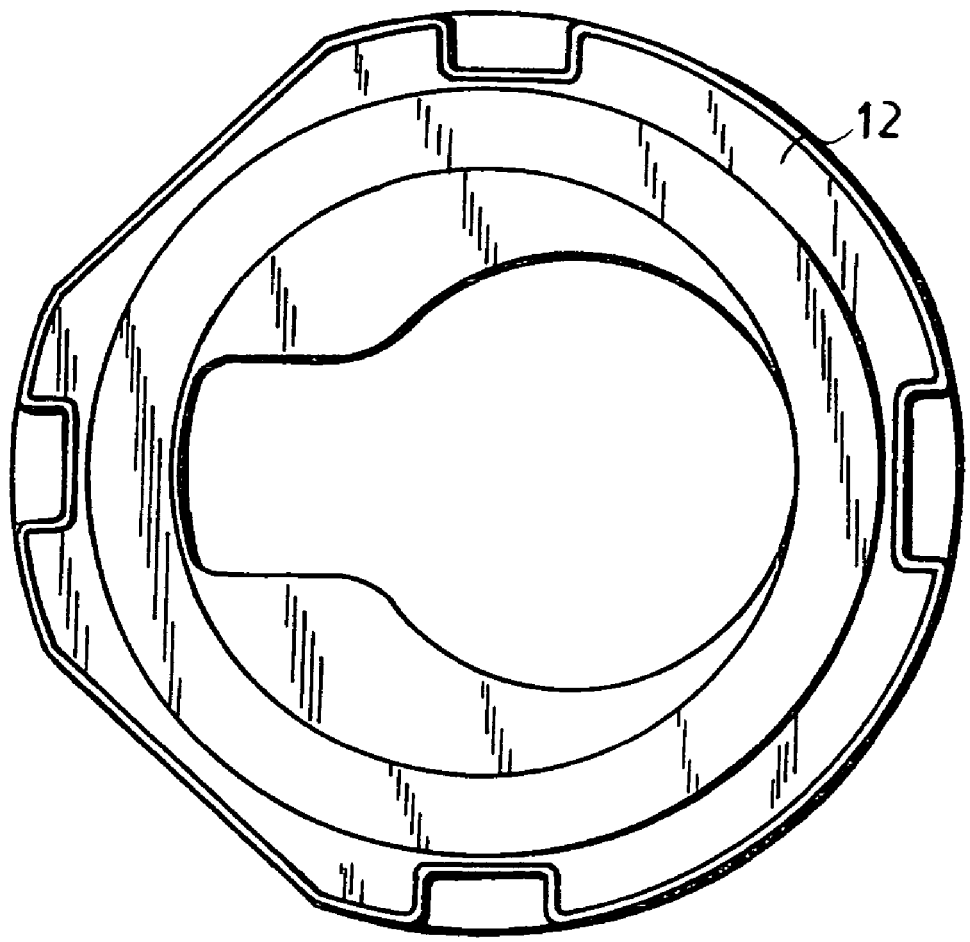
Fig. 5a
Fig. 5b

MIXING VALVE CARTRIDGE

CROSS-REFERENCE TO RELATED APPLICATION

This application claims the priority of Hungarian Patent Application No. P 0302813, filed on Sep. 1, 2003, the subject matter of which is incorporated herein by reference.

BACKGROUND OF THE INVENTION

The invention relates to a mixing valve cartridge used mainly for mixing cold and hot water, preferably a universal mixing valve cartridge with plane discs.

Cartridges are essentially valve inserts which realize in one single structural unit the closing of the cold and hot water pipes, their opening when necessary, the mixing of the cold and hot water, and directing of the mixed water to the outlet.

In their basic form, the cartridges comprise a housing closed up by a bottom plate, and inside this housing, an inlet disc one side of which is connected to the bottom plate, whereas its other side is coupled to a rotatable and movable control disc.

The movement of the control disc is ensured by a bearing supported lever being in a lever holder, through a ceramic moving element.

The lever holder is arranged in the housing of the cartridge so that it is rotatable.

Appropriate bores and cavities are situated in both the inlet and the control disc for controlling the flow of the cold and hot water, and the outflow of the mixed water.

The aim of the cartridge according to the invention is to provide a novel design of the control disc and the ceramic moving element in the cartridge by means of which the tolerance regarding the pressure inserted on the elements, i.e. the pressure resistance of the cartridges increases in both opened and closed position, when the outlet is pushed.

In order to make the invention more clear, FIG. 1 shows a generally used arrangement of the ceramic moving element K and control disc SZ in a cartridge. FIG. 1 illustrates a ceramic moving element K coupled to a control disc SZ. In the ceramic moving element K a groove H is situated, into which a gasket T of the form of an annulus is placed protruding a little from groove H and bears up against control disc SZ ensuring here an appropriate seal between the ceramic moving element K and the control disc SZ. Between ceramic moving element K and control disc SZ, a slot y is to be found lying in the direction of the axis of the cartridge, mainly it is needed for technological reasons for avoiding the over determination of the arrangement of the elements. The disadvantage of this solution is that as the pressure increases (and in certain cases it could be quite large), the slot y inside the cartridge between the ceramic moving element K and the control disc SZ increases, gasket T will expand so that it may eventually be even blow out.

SUMMARY OF THE INVENTION

An object of the invention is to produce an arrangement in which the position of the elements remains stable, i.e. the slot between the ceramic moving element and the control disc does not change at all, or only to a small extent, and at the same time, the gasket is situated so that its lifetime significantly increases due to its smaller deformation under pressure.

Thus, the invention relates to a mixing valve cartridge used mainly for mixing cold and hot water, in the housing of which two superimposed discs forming a plane seal with each other are to be found, one of them is a fixed inlet disc, the other one a control disc situated at one side of the inlet disc so that it is rotatable and movable, the control disc is in a driving connection with a lever provided with a bearing and situated in a lever holder via a ceramic moving element, the lever holder can be rotated in the housing of the cartridge. At the other side of the inlet disc a bottom plate provided with inlet bores and forming the bottom of the housing of the cartridge is positioned, one side of which is in connection with the inlet disc, whereas the other one is developed so that it can be connected to the valve provided with connection ducts.

The essence of the invention consists in that in the ceramic moving element on its side to the control disc a stepped part parallel to the axis of the housing coupled to the groove is developed, and in the control disc another stepped part fitting to the above stepped part is to be found, and between the stepped parts a radial slot is situated which remains unchanged also during operation.

It is preferred that the stepped parts are have vertical walls being parallel to the axis of the cartridge and horizontal walls being perpendicular to the vertical walls.

BRIEF DESCRIPTION OF THE DRAWINGS

The mixing valve cartridge according to the invention is described in detail on the basis of an embodiment illustrated in the Figures as an example.

FIGS. 5a and 5b illustrate a lateral section and the top view of the control disc according to the invention.

DETAILED DESCRIPTION OF THE INVENTION

Figure 1:
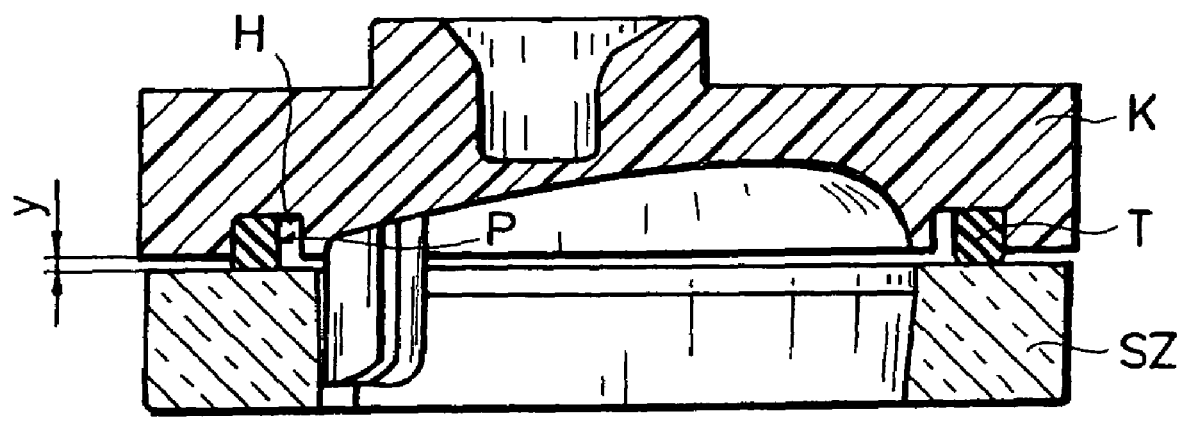
FIG. 1 is a lateral section of the prior art arrangement of the control disc—ceramic moving element.

FIG. 1 shows, as it was mentioned in the introductory art, the lateral section of the arrangement of the ceramic moving element K and control disc SZ in a cartridge used according to the prior art for mixing of cold and hot water. Only those elements are shown in FIG. 1, which are developed differently according to the invention as in the usual solutions, or their bearing force is different.

It can be seen in FIG. 1 that ceramic moving element K and control disc SZ are superimposed forming a flat plane so that in the surface of ceramic moving element K to the side of control disc SZ a groove H is developed, provided with a gasket T which has to be pressure-resistant in order to resist the pressure P in the cartridge during use. It is also seen in FIG. 1 that parallel to the axis of the cartridge, between ceramic moving element K and control disc SZ, a slot y is to be found into which gasket T reaches. When a pressure P develops, as an effect of this, ceramic moving element K and control disc SZ move away from each other, the material of gasket T becomes deformed, in certain cases it may also be ruined or blow up, making thereby the whole cartridge unusable.

The aim of the invention is to solve this problem. We have recognized, namely, that if gasket T is placed so that its deformation effected by the pressure is less, than usual and, at the same time, ceramic moving element K and control disc SZ are arranged so that their position to each other does not change, a more reliable cartridge with a longer function time can be obtained.

Figure 2:
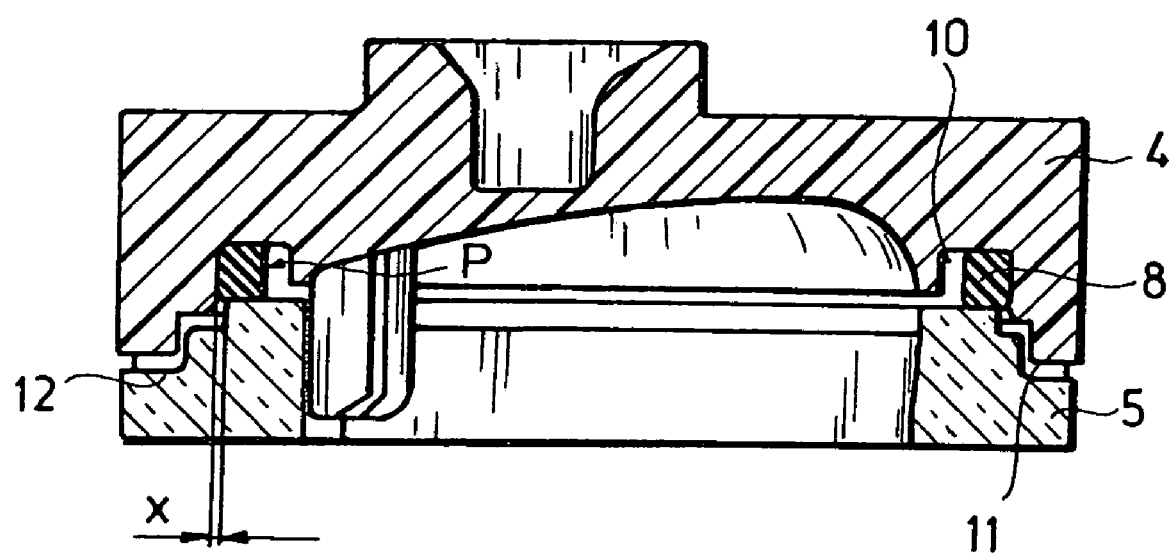
FIG. 2 shows a lateral section of the arrangement of the control disc—ceramic moving element according to the invention in its starting position.
Figure 3:
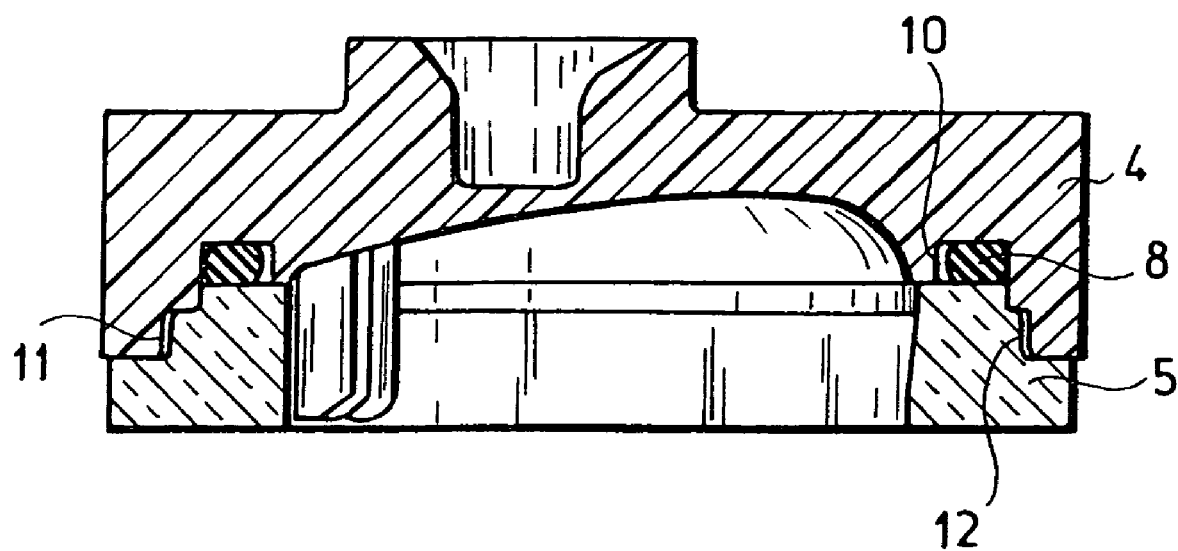
FIG. 3 illustrates in lateral section a mounted position of the arrangement of the control disc—ceramic moving element according to the invention.

FIGS. 2 and 3 show the arrangement of ceramic moving element 4 and control disc 5 in the cartridge according to the invention in a lateral section, at mounting and in operation.

FIGS. 2 and 3 illustrate the arrangement and an embodiment used as an example of ceramic moving element 4 and control disc 5. Between the ceramic moving element 4 and the control disc 5 is a groove 10 in which a gasket 8 is arranged. Ceramic moving element 4 and control disc 5 are developed so that at the part where gasket 8 is placed, in both elements with stepped parts 11 and 12 are formed fitting to each other, but between them a radial slot x perpendicular to the axis of the cartridge is to be found. When pressure P develops, due to the increase of pressure, the radial surfaces of the stepped parts 11 and 12 adjoin each other, however, as a result of this movement, the size of slot x does not change. It can be observed well in FIG. 3 that pressure P has practically no effect on gasket 8, thus its durability significantly increases by increasing at the same time also the lifetime of the cartridge. As you can see, the main difference between the known solutions and the invention lies in the arrangement of the slot y and slot x. The arrangement of the stepped parts 11 and 12 with radial slot x according to the invention ensures the realization of the aim of the invention.

Figure 4A:
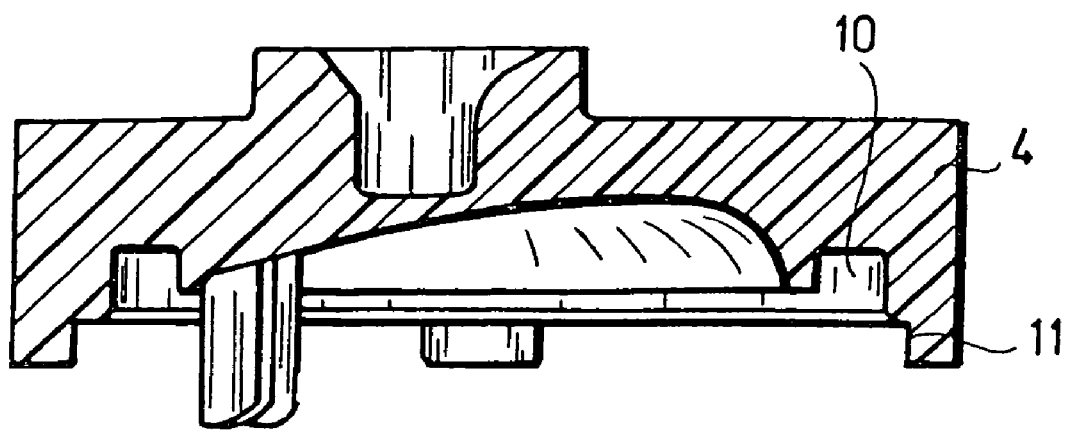
FIGS. 4a and 4b show a lateral section and the top view of the ceramic moving element according to the invention.
Figure 4B:
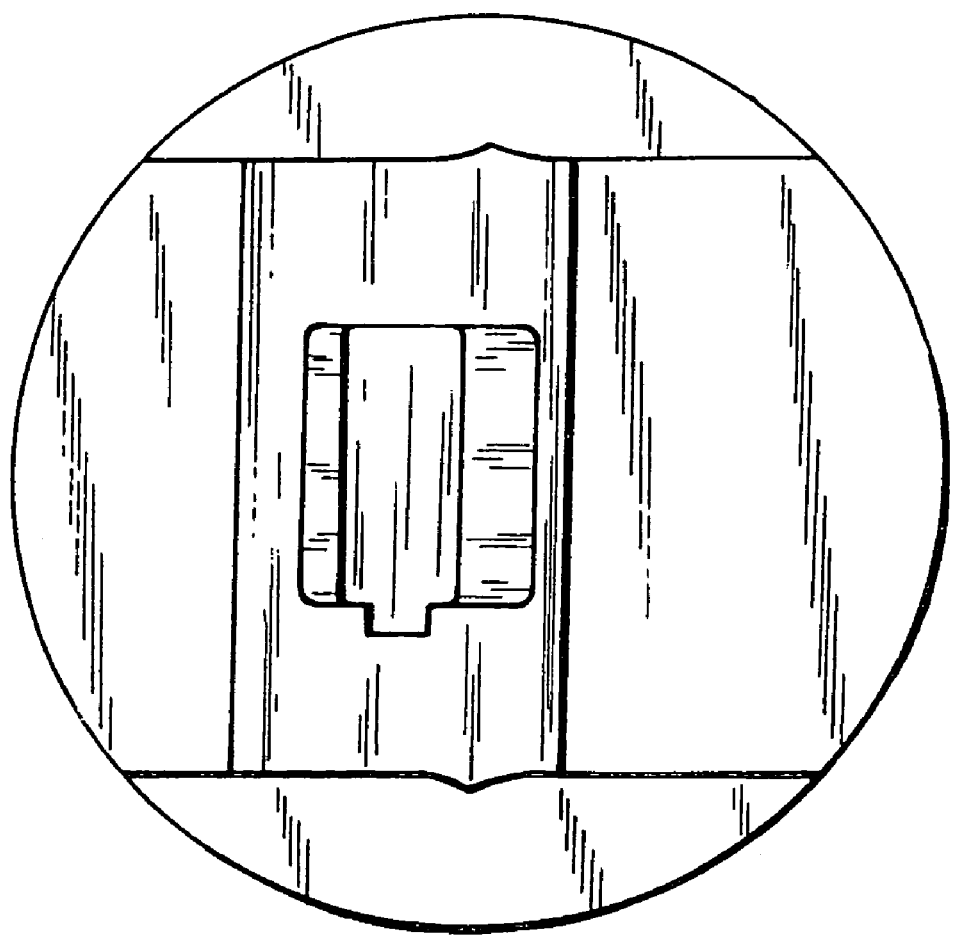

FIGS. 4a and 4b show the lateral section and top view of ceramic moving element 4, whereas in FIGS. 5a and 5b those of control disc 5 are illustrated for one embodiment each.

Figure 6:
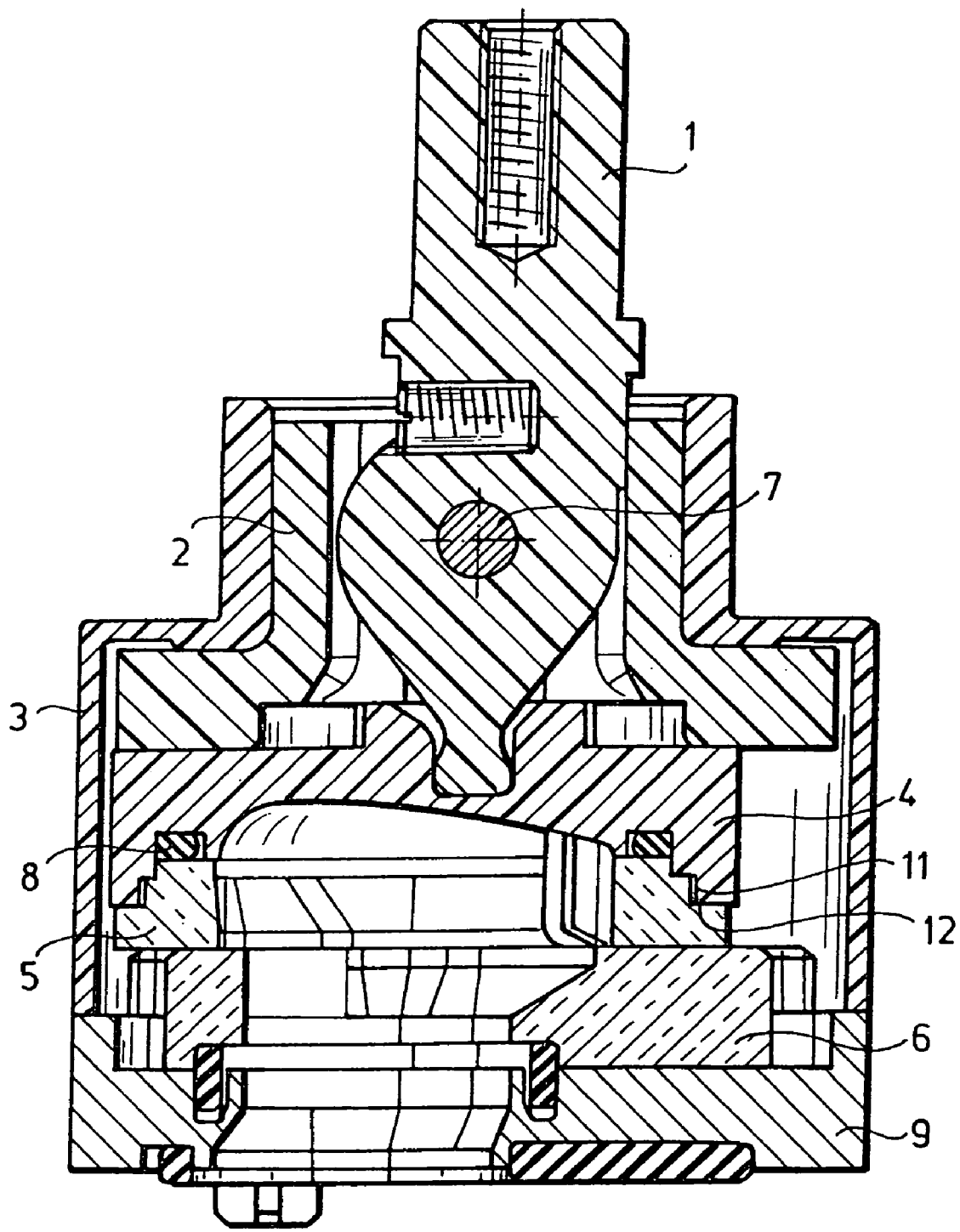
FIG. 6 is a main section of the cartridge according to the invention in its mounted position.

FIG. 6. shows the main section of the cartridge according to the invention in its mounted position.

A lever holder 2 is also shown, in which lever 1 is supported by a bearing around a rotation axis 7 that is in a driving connection with control disc 5 via ceramic moving element 4 and is situated at one side of control disc 5. At its other side of the control disc 5 an inlet disc 6 is arranged having cavities for introducing cold and hot water and letting out the mixed water.

Thus one side of inlet disc 6 is connected to control disc 5, whereas other side of the inlet disc 6 in connection with one side of bottom plate 9 forming the bottom of housing 3. In the holes in bottom plate 9 and inlet disc 6, seals are placed as known from the prior art.

It can be seen in FIG. 6 how the stepped parts 11 and 12 fitting to each other, and are arranged in the housing 3 of the cartridge.

The cavities in the inlet disc 6 can be closed or bridged over by control disc 5, thereby the amount and temperature of the mixed water flowing out through the cavities in bottom plate 9 into cartridge body can be regulated.

The invention eliminates the increase of slot x to be sealed by a gasket in function of pressure. The fact that slot x is positioned in a direction perpendicular to the direction of pressure is also favourable from the viewpoint of good sealing. In summary, it can be said that the advantage of the cartridge according to the invention is that by developing the stepped parts in ceramic moving element 4 and control disc 5, the durability of the seal between ceramic moving element 4 and control disc 5, and thereby that of the whole cartridge increases.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A mixing valve cartridge for mixing cold and hot water, comprising:
    a cartridge housing;
    two, superimposed discs disposed in the cartridge housing and forming together a plane seal, one of the superimposed discs constituting a fixed inlet disc and the other of the superimposed discs constituting a control disc arranged on one side of the inlet disc in a movable and rotatable way;
    a ceramic moving element having a groove for receiving a gasket;
    a lever;
    a lever holder arranged in the cartridge housing in a rotatable position, the lever being supported by a bearing sitting in the lever holder and being in a driving connection with the control disc via the ceramic moving element;
    a bottom plate provided with inlet holes arranged at the other side of the inlet disc and forming a bottom part of the housing, one side of the bottom plate being connected to the inlet disc, the other side of the bottom plate adapted for being connectable with connecting ducts,
    wherein the ceramic moving element has a side facing the control disc that includes an annular stepped part parallel to the axis of the cartridge housing that is connected to the groove, and the control disc has an annular stepped part fitting the annular stepped part of the ceramic moving element, and between the annular stepped parts a radial slot is situated which remains unchanged during operation of the mixing valve.

2. The cartridge according to claim 1, wherein the annular stepped parts have vertical walls parallel to the axis of the cartridge housing and horizontal walls perpendicular to the vertical walls.

* * * * *